(12) United States Patent
Walder

(10) Patent No.: US 9,194,021 B2
(45) Date of Patent: Nov. 24, 2015

(54) LEACHING OF MINERALS AND SEQUESTRATION OF $CO_2$

(75) Inventor: Ingar F. Walder, Vestbygd (NO)

(73) Assignee: KJEOY RESEARCH & EDUCATION CENTER (NO)

( * ) Notice: Subject to any disclaimer, the term of this patent is extended or adjusted under 35 U.S.C. 154(b) by 171 days.

(21) Appl. No.: 14/126,932

(22) PCT Filed: Jun. 15, 2012

(86) PCT No.: PCT/IB2012/053022
§ 371 (c)(1),
(2), (4) Date: Mar. 13, 2014

(87) PCT Pub. No.: WO2012/172512
PCT Pub. Date: Dec. 20, 2012

(65) Prior Publication Data
US 2014/0205520 A1 Jul. 24, 2014

(30) Foreign Application Priority Data
Jun. 17, 2011 (NO) .................................. 20110872

(51) Int. Cl.
*B01D 53/62* (2006.01)
*C22B 3/02* (2006.01)
(Continued)

(52) U.S. Cl.
CPC . *C22B 3/06* (2013.01); *B01D 53/62* (2013.01); *B01D 53/80* (2013.01); *C22B 3/02* (2013.01); *C22B 26/20* (2013.01); *C22B 26/22* (2013.01); *B01D 2251/30* (2013.01); *B01D 2251/40* (2013.01); *B01D 2251/402* (2013.01); *B01D 2251/404* (2013.01); *B01D 2251/502* (2013.01); *B01D 2251/504* (2013.01); *B01D 2251/506* (2013.01); *B01D 2251/60* (2013.01);
(Continued)

(58) Field of Classification Search
CPC .............. C22B 3/06; C22B 3/02; C22B 3/04; B01D 53/62; Y02C 10/04
See application file for complete search history.

(56) References Cited

U.S. PATENT DOCUMENTS 1,825,949 A * 10/1931 Haas ................................. 423/33
4,058,587 A * 11/1977 Nelson .......................... 423/220
(Continued)

FOREIGN PATENT DOCUMENTS

| DE | 2733727 A1 * | 2/1979 | ................ C22B 3/06 |
| GB | 0819597 | * 12/2008 | .............. C01B 31/24 |

(Continued)

OTHER PUBLICATIONS

Haug, T.A., Dissolution and Carbonation of Mechanicaly Activated Olivine—Investigating CO2 Sequestration Possibilities; PhD thesis, NTNU, ; 243 pages; 2010 (Part 1: submitted in 2 parts).
(Continued)

*Primary Examiner* — Timothy Vanoy
(74) *Attorney, Agent, or Firm* — Cantor Colburn LLP

(57) ABSTRACT

A method for leaching of minerals and sequestration of $CO_2$ is disclosed, wherein the method comprises forming a rock pile; injecting exhaust gas containing $CO_2$ in the lower part of the rock pile; spraying leaching liquid on top of the rock pile; collecting enriched leaching liquid from a lower part of the rock pile; precipitating mineral carbonates from the enriched leaching liquid, or further extracting dissolved elements or compounds.

15 Claims, 2 Drawing Sheets

(51) Int. Cl.
  *C22B 3/04* (2006.01)
  *C22B 3/06* (2006.01)
  *B01D 53/80* (2006.01)
  *C22B 26/20* (2006.01)
  *C22B 26/22* (2006.01)

(52) U.S. Cl.
  CPC ....... *B01D2251/602* (2013.01); *B01D 2251/70* (2013.01); *B01D 2257/504* (2013.01); *B01D 2258/0283* (2013.01); *Y02C 10/04* (2013.01)

(56) References Cited

U.S. PATENT DOCUMENTS

| | | | |
|---|---|---|---|
| 4,358,158 A * | 11/1982 | Showalter | 299/4 |
| 6,280,501 B1 * | 8/2001 | Ferron | 75/743 |
| 7,682,419 B2 * | 3/2010 | Shapovalov et al. | 75/743 |
| 2005/0211019 A1 | 9/2005 | Crundwell et al. | |
| 2008/0299024 A1 * | 12/2008 | Gorset et al. | 423/22 |
| 2014/0127094 A1 * | 5/2014 | Eaton | 423/1 |

FOREIGN PATENT DOCUMENTS

| | | |
|---|---|---|
| WO | 0071763 A1 | 11/2000 |
| WO | 2008046114 A3 | 4/2008 |
| WO | 2008061305 A1 | 5/2008 |
| WO | 2011017771 A1 | 2/2011 |

OTHER PUBLICATIONS

Haug, T.A., Dissolution and Carbonation of Mechanicaly Activated Olivine—Investigating CO2 Sequestration Possibilities; PhD thesis, NTNU, ; 243 pages; 2010 (Part 2: submitted in 2 parts).

Korneliussen, A.; Lecture; presentation: "Possibilities for Use of CO2 for Increased Added Value within Mineral Based Industry"; Bellona, Oslo; 24 pages; Mar. 3, 2011; Abstract in English prepared by Dorte Lajer, Onsagers AS 2015; 4 pages.

Gerdemann et al.; "Ex Situ Aqueous Mineral Carbonation"; Environ. Sci. Technol; 41; pp. 2587-2593; (2007).

Haug, T.A., Dissolution and Carbonation of Mechanically Activated Olivine—Investigating CO2 Sequestration Possibilities; PhD thesis, NTNU, ; 243 pages; 2010.

Korneliussen, A.; Lecture; "Possibilities for Use of CO2 for Increased Added Value within Mineral Based Industry"; Bellona, Oslo; 24 pages; Mar. 3, 2011 (http://bellona.org/ccs/uploads/media/presentation_ngu.pdf).

Norwegian Application 20110872; Norwegan Search Report dated Jan. 17, 2012; 2 pages.

O'Connor et al.; "Resarch Status on the Sequestration of Carbon Dioxide by Direct Aqueous Mineral Carbonation"; Proceedings, Session 35, 35-1, 18th Annual International Pittsburgh Coal Conference, Newcastle, NSW, Australia; Dec. 2001.

International Search Report and Written Opinion; International Application No. PCT/IB2012/053022; International Filing Date Jun. 15, 2012; Date of Mailing Sep. 7, 2012; 10 pages.

Schuiling, Roelof Dirk; "Mineral Sequestration of CO2 and Recovery of the Heat of Reaction"; Macro-Engineering: A Challenge for the Future, Water Science and Technology Library; 54; pp. 21-29; (2006).

Sipila et al.; "Carbon Dioxide Sequestration by Mineral Carbonation-Literature Review Update 2005-2007"; Abo Akademi University, Heat Engineering Laboratory reports 2008-1; 59 pages.

Wilson et al.; "Carbon Dioxide Fixation within Mine Wasters of Ultramafic-Hosted Ore Deposits: Examples from the Clinton Creek and Cassiar Chrysotile Deposits, Canada"; Economic Geology; 104; pp. 95-112; (2009).

* cited by examiner

LEACHING OF MINERALS AND SEQUESTRATION OF CO$_2$

CROSS-REFERENCE TO RELATED APPLICATIONS

This application is a §371 of PCT/IB2012/053022 filed on Jun. 15, 2012, which claims the benefit of priority to Norwegian Application No. 20110872, filed on Jun. 17, 2011, under the provisions of 35 U.S.C. §119 and the International Convention for the protection of Industrial Property, which are incorporated herein by reference.

The present invention relates to a method and processing plant for combined mineral leaching and CO$_2$ sequestration.

BACKGROUND

The release of CO$_2$ from combustion of fossil fuels and from industrial processes such as cement production, roasting of ores, and steel production has gained much interest in recent years due to the influence of CO$_2$ on the environment and effects such as global warming. Many of the sources of CO$_2$ such as emissions from power plants comprise only a few percent CO$_2$ and accordingly huge amounts of emissions have to be treated to separate the CO$_2$ formed during combustion. Much focus has been on methods for CO$_2$ capture using liquid absorbents. These processes, so far, have had a high energy demand and have resulted in a CO$_2$ stream for which permanent storage or reuse has to be secured in a secondary process.

PRIOR ART

The natural fixation of atmospheric CO$_2$ in mine wastes has been studied earlier with the focus to document the fixation with respect to the total carbon dioxide impact of the mining process. The natural occurring passive reaction between mine tailings and atmospheric CO$_2$ may result in a reduction in the overall CO$_2$ impact of the mining. The results of such a study are disclosed by Wilson S. A. et al. in "Carbon Dioxide Fixation within Mine Wastes of Ultramafic-Hosted Ore Deposits: Examples from the Clinton Creek and Cassiar Chrysotile Deposits, Canada." Econ. Geol. v. 104, pp. 95-112 (2009).

Natural fixation of CO$_2$ is also facilitated by silicate mineral weathering and carbonate precipitation primarily in oceans but also as caliche in soils.

Investigations have also been carried out involving the mechanical activation by milling of mineral rocks to increase the available surface area and, thereby, obtaining increased reaction between gas containing CO$_2$ and solid minerals. However the reactions rates have still been too slow for application in an industrial process (Haug, T. A., Dissolution and carbonation of mechanically activated olivine—Investigating CO$_2$ sequestration possibilities, PhD thesis, NTNU, 2010).

Leading researchers in the field have concluded that ex-situ mineral carbonatisation is too expensive (high energy consumption) to be viable even though considerable reaction was obtained within a few hours by use of olivine. Different type of pretreatment (thermal and/or mechanical activation etc.), was tried in high temperature high-pressure reaction chambers (O'Connor, W. K. et al., December 2001, "Research Status on the Sequestration of carbon dioxide by direct Aqueous Mineral Carbonation" Proceedings, Session 35, 35-1, 18$^{th}$ Annual International Pittsburgh Coal Conference, DOE/ARC—2002-001.

Gerdemann et al. "Ex Situ Aqueous Mineral Carbonation", Environ. Sci. Technol. 2007, 41, 2587-2593 further evaluated dissolution rate of finely ground olivine and serpentine in a supercritical CO$_2$-water solution in a high temperature and pressure vessel, and converted to magnesium carbonate 81% of the olivine in a few hours and 92% of preheated serpentine in one hour.

Extracting elements such as gold, silver, copper, nickel, and uranium from rock piles or within contained systems using hydrochloric acid, sulfuric acid, carbonate, cyanide with or without the aid of microbiology processes are well known (Weiss, N. L., (Ed.) SME Mineral Processing Handbook, Society of Mining Engineers, 1985).

WO2008/061305 disclose a process in which a an alkali metal or alkaline earth metal silicate feedstock is thermal pre-activated by heating to 500-800° C. and suspending of the feedstock in a solvent before being reacted with CO$_2$. The heating source is the power plant itself that is also the source of CO$_2$. In the disclosed process the carbonation is taking place within the silicate.

OBJECTIVES OF THE INVENTION

An aim of the present invention is to provide a process which: 1) reuses CO$_2$ to obtain other compounds resulting in a solid CO$_2$ containing compound with limited requirements for storage; 2) can in itself be reused; and 3) enhances the leaching rate and efficiency of silicate minerals combined with metal oxides and sulfides for element extraction.

A further aim of this invention is to provide a process at atmospheric pressure, which reuses CO$_2$ from gas emission at hydrocarbon fired power plants, steal making plants, cement and lime plants or similar large scale point source emitters to enhance mineral leaching of silica source rocks. Where the process allows for 1) mineral precipitation separated from the silicate source rocks and/or 2) extraction of elements or complexes from silicates and other minerals within the material for further processing by precipitation, solvent extraction, ion exchange etc. where the precipitated carbonate mineral may be a main product or a byproduct of the process.

A further aim is to reuse any heat energy contained in the CO$_2$ waste gas, thereby, increasing the efficiency of the process compared to conventional processes in that the heat increases the reaction rates; and the conventional need for cooling is limited.

It is also an aim to provide a process in which the influence on the environment can be limited and controlled.

The present invention provides a method for leaching of minerals and sequestration of CO$_2$, characterized in that the method comprises:
  forming a rock pile;
  injecting emission gas comprising CO$_2$ into the lower part of the rock pile;
  supplying leaching liquid in a top part of the rock pile;
  collecting enriched leaching liquid from a lower part of the rock pile, comprising dissolved minerals and carbonate ions.

In one embodiment of the invention the method may further comprise precipitating mineral carbonates from the enriched leaching liquid, thereby sequestering CO$_2$ in the form of solid mineral carbonates. In one embodiment the precipitation is controlled by controlling the pH of the leaching solution.

Further the method according to the present invention may comprise extracting one or more metals from the enriched leaching liquid before or after sequestering $CO_2$ in the form of solid mineral carbonates.

In one aspect the extraction is performed by pH or $E_h$ controlled precipitation, by ion exchange, or solvent extraction electro winning.

In one aspect of the invention the rock utilized in the method is tailings or waste rock material from the extractive industry. The rock pile may comprise silicates comprising carbonate forming elements selected from the group comprising calcium, magnesium, and iron. The rock in the rock pile may in one embodiment of the present invention comprise silicates, oxide minerals enriched in one or more metals selected from the group comprising: copper, nickel, silver, zinc, uranium, thorium, wolfram, molybdenum and rare earth elements (REE) optionally together with one or more sulfide minerals of copper, nickel, zinc or silver.

The leaching liquid applied in the present invention can be selected from the group comprising water, hydrochloric acid, sulfuric acid, nitric acid, carbonic acid or mixtures thereof.

In a preferred embodiment the emission gas containing $CO_2$ contains rest heat, which heats the rock pile and the leaching liquid and thereby enhances the reaction rates. The emission gas may in one aspect be power plant gas emission or hydrated lime/lime-cement plant gas emission.

The present invention further provides a plant for leaching of minerals and sequestration of $CO_2$ characterized in that the plant comprises a rock pile, a gas distribution system arranged below or in the lower part of the rock pile in fluid communication with a source for emission gas comprising $CO_2$ and comprising gas outlets for releasing emission gas into the rock pile, the plant further comprises a leaching liquid distribution system arranged above or in a upper part of the rock pile and a enriched leaching liquid collection system arranged below the gas outlets.

In one embodiment of the plant according to the present invention the enriched leaching liquid collection system comprises at least one pipeline in fluid communication with a precipitation unit, where said precipitation unit comprises pH-controlling or $E_h$-controlling equipment; and wherein the precipitation unit is adapted for precipitation of metal carbonates from the leaching liquid.

In another embodiment the enriched leaching liquid collection system comprises at least one pipeline in fluid communication with a plant for extracting one or more metals selected from the group comprising copper, zinc, nickel, rare earth elements, uranium, wolfram, molybdenum and thorium by solvent extracting, ion exchange, or pH or $E_h$ controlled precipitation.

The gas distribution system may in one aspect of the invention comprise mainly vertically pipes arranged at the bottom of the rock pile with a plurality of openings.

The term "tailing and waste from extractive industry" as applied here refers to the same definition as applied in the Council of the European Union (2006) Directive 2006/21/EC of the European Parliament and of the Council of 15 Mar. 2006 on the management of waste from the extractive industries and amending Directive 2004/35/EC: OJ L 102/06 Apr. 11, 2006.

The term "emission gas comprising $CO_2$" refers to emission gas from carbon fuel based power plants. The emission gas can be any treated or untreated exhaust gas streams including recycled gas streams and emission gas with increased $CO_2$ content obtained by any method including methods involving $CO_2$ capture. The term "emission gas comprising $CO_2$" refers also to emission gas from steal making plants, cement and lime plants or similar large scale point source $CO_2$ emitters.

The increasing focus on $CO_2$ emission as a tradable commodity opens opportunities for utilizing the emission gases for mineral leaching not only for $CO_2$ mineral sequestration, but also for element extraction.

PRINCIPAL DESCRIPTION OF THE INVENTION

The present invention will now be described in further detail with reference to the enclosed figure illustrating schematically one embodiment of the present invention.

Figure 1:
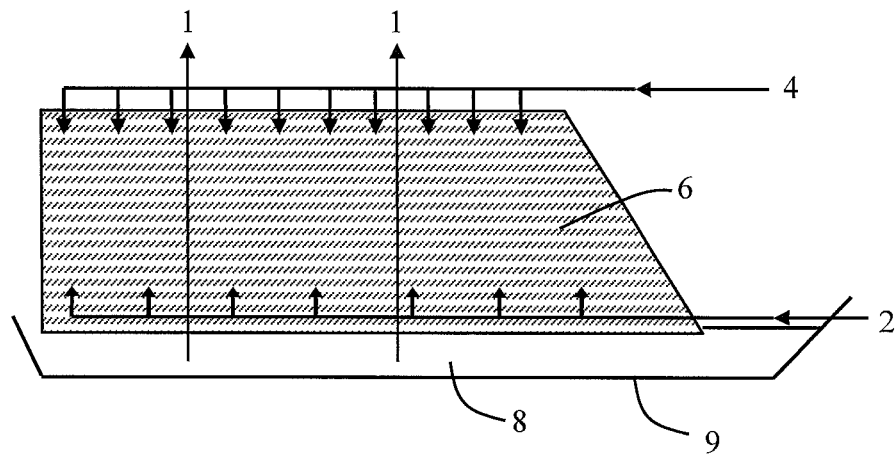
FIG. 1 is schematic illustration of an embodiment of a method according to the present invention.

FIG. 1 illustrates how emission gas 2 containing $CO_2$ and possible rest heat is fed and distributed at the bottom of a heap/rock pile 6. Leaching liquid 4 is distributed over the rock pile 6 from the top. The distribution of the leaching liquid can be performed through a dripping system or a spraying system or similar system for distributing a liquid over a surface. The leaching liquid comprises water optionally containing leaching aids such as ligands and/or additional acids. The leaching liquid 4 will trickle down through the pile 6; whereas the $CO_2$ containing gas will pass from the bottom and up through the rock pile. When the two streams are brought into contact, $CO_2$ is dissolved in the liquid and carbonic acid is formed. The acid will react with the minerals in the rock and, thereby, act as a leaching acid dissolving the minerals. Leaching liquid and dissolved minerals are collected at the bottom of the pile 8. In FIG. 1, the bottom of the pile 8 is illustrated with a liner 9 or another form of liquid collection means for collection; however, in other embodiments of the present invention, the rock pile may be placed directly on soils or bedrocks. Wells 1 are arranged for removing the leachate comprised of water, dissolved solids and carbonate ions.

The leaching stream from the wells 1 may be processed further to precipitate the minerals as carbonates. Depending on the composition of the original minerals and the concentration obtained, it may be possible to perform a controlled precipitation where the minerals are obtained as separated carbonates; or alternatively, the carbonates can be precipitated as a carbonate mixture. By controlled precipitation, pure mineral carbonates can be obtained which can be used in other processes. The carbonate mixture is applicable for storage. Other elements such as copper, zinc, silver, nickel, rare earth elements (REE), wolfram, molybdenum, uranium and thorium, enriched in the leachate may be processed further.

Figure 2:
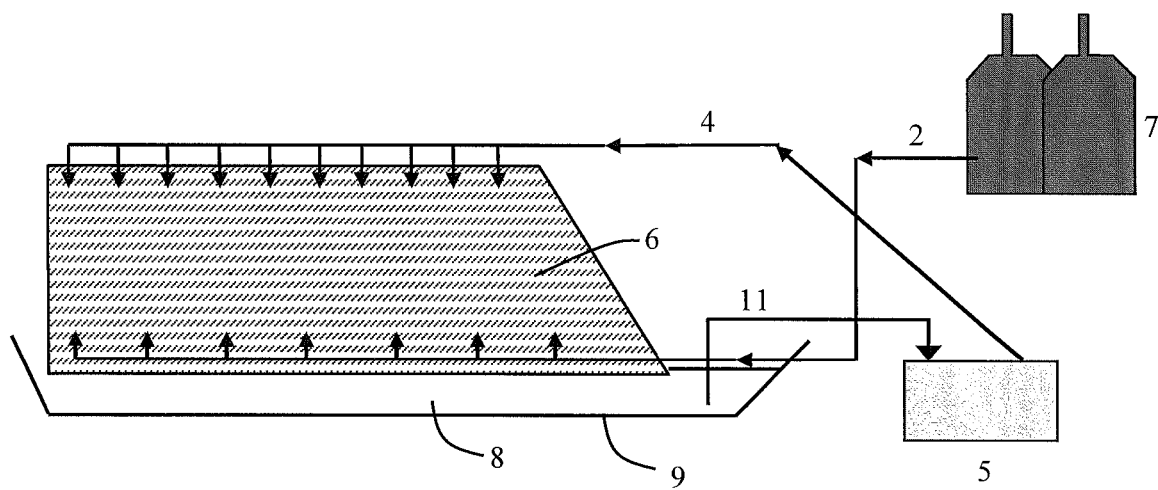
FIG. 2 schematically illustrates a second embodiment of the present invention.

FIG. 2 illustrates a second embodiment of the present invention. Emission gas 2 comprising $CO_2$ is obtained from a plant 7 and fed to the bottom of the rock pile 6.

Leaching liquid is constrained to the area 8 by a liner 9. The leaching liquid comprising leached minerals is removed from the area 8 via the pipeline 11 and fed to a separate carbonate mineral precipitation and element extraction plant 5. After the precipitation process the leaching liquid is returned through pipeline 4 to the top of the rock heap 6. Additional liquid may be introduced to compensate any liquid lost during the processing.

Figure 3:
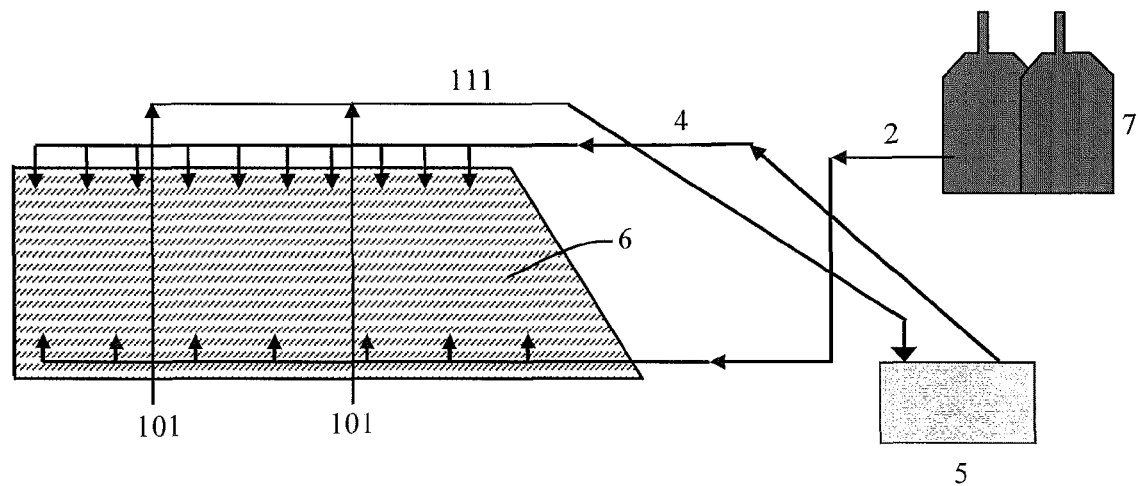
FIG. 3 illustrates schematically a third embodiment of the present invention.

FIG. 3 illustrates a third embodiment of the present invention. Here the rock pile is not placed on a liner or another type of constructed liquid collection means. In stead the leaching liquid is trickling into the ground below the rock pile from where it is removed via the wells 101. The collected rich leaching liquid is transported via pipeline 111 to the separate carbonate mineral precipitation and element extraction plant 5. Lean leaching liquid is returned to the rock pile through line 4.

Figure 4:
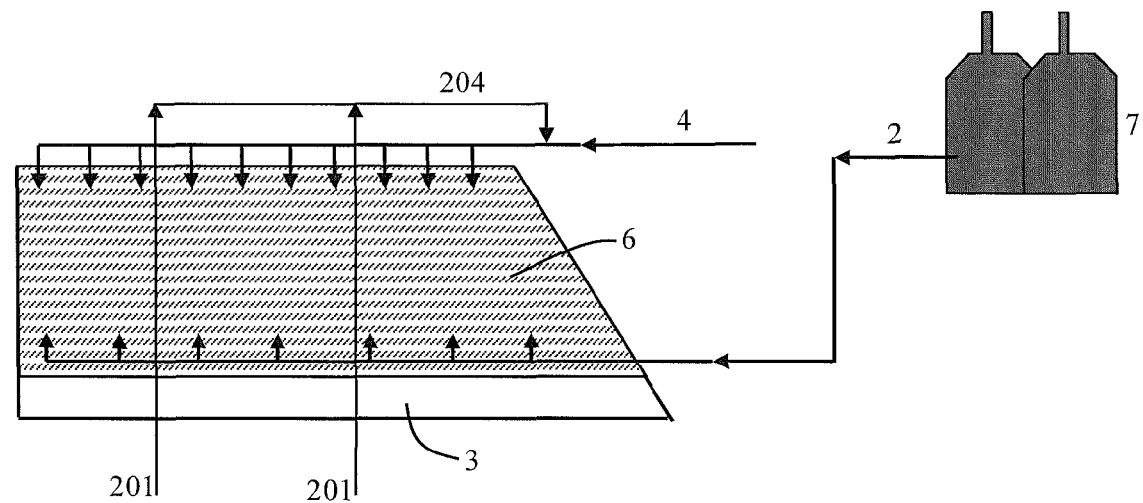
FIG. 4 is a schematic illustration of a fourth embodiment of the present invention.

FIG. 4 illustrates a fourth embodiment of the present invention. In this embodiment the precipitation of carbonate minerals is allowed to take place in the ground 3 below the rock pile. This embodiment comprises ground water wells 201 with a water inlet arranged in the ground below the rock pile preferably below the area 3 in which the precipitation takes place. The ground water is employed as initial leaching liquid and supplied to the top of the rock pile via pipeline 204. Additional liquids 4 including water and acids from other process may be introduced into the leaching liquid.

In one embodiment of the present invention in a large scale operation, a large dump/pile of silica based rock is built, water is sprayed on the top and warm emission gas from the power plant is injected at the bottom to be able to sequester $CO_2$. The emission gas from the power plant will commonly have 3-5% $CO_2$, lower with gas-fired power plants and higher with coal-fired power plants; while $CO_2$ concentrations in emission gases from cement/lime manufactures will be considerably higher. When the warm emission gas is mixed with water, it will form carbonic acid with a pH around 4. Neutralising reactions by the silicate minerals may result in hydrolyses of the carbonic acid forming bicarbonate and possibly carbonate if the pH becomes very high, according to equation 1.

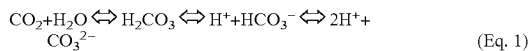

$$CO_2 + H_2O \Leftrightarrow H_2CO_3 \Leftrightarrow H^+ + HCO_3^- \Leftrightarrow 2H^+ + CO_3^{2-} \quad (Eq.\ 1)$$

There may also be other acids formed depending upon the constituents of the fuel source, temperature of the burning and material heated if not a power plant. The carbonic acid will result in dissolution of Ca, Mg, and Fe silicate minerals, thereby, giving an opportunity to precipitate carbonate minerals if the pH is raised. The increased $CO_2$ content will also enhance the conditions for microbial growth thus increasing reaction rates of silicates and sulphide minerals within the silicate rocks.

The carbonate mineral precipitation can take place either in a section 8 under the $CO_2$ injection or in a separate pH mixing and precipitation tank. Other processes such as solvent extraction and ion exchange may also remove other elements.

Reactions within the rock pile can be illustrated by the following equations showing the reactions of brucite and diopside with carbonic acid, respectively.

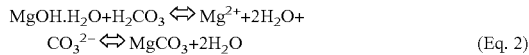

$$MgOH.H_2O + H_2CO_3 \Leftrightarrow Mg^{2+} + 2H_2O + CO_3^{2-} \Leftrightarrow MgCO_3 + 2H_2O \quad (Eq.\ 2)$$

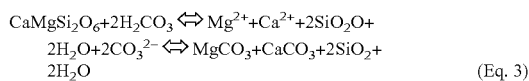

$$CaMgSi_2O_6 + 2H_2CO_3 \Leftrightarrow Mg^{2+} + Ca^{2+} + 2SiO_2O + 2H_2O + 2CO_3^{2-} \Leftrightarrow MgCO_3 + CaCO_3 + 2SiO_2 + 2H_2O \quad (Eq.\ 3)$$

These equations are not to be construed as limiting for the reactions that may take place within the rock pile but serve to illustrate the situation. Both equations comprise a first step resulting in the original minerals being at least partly dissolved with dissolved Ca and or Mg ions. In the second step $CaCO_3$ and or $MgCO_3$ are formed and can be precipitated.

The precipitation can occur within the rock heap but preferably takes place in a separate reaction chamber to allow for production of $CaCO_3$ and or $MgCO_3$ and possibly additional carbonates as separate valuable products. The precipitation of selected compounds can be controlled by controlling the increase in pH (or use of ion exchange, solvent extraction electro winning etc.). Depending on the base added to increase the pH additional carbonates with counter ion of the base will be formed. The precipitation process can also be controlled by controlling the $E_h$ (the redox potential).

There may also be incongruent reactions where other secondary minerals are formed and only part of the elements are released into the leaching solution.

The present invention is not limited to a specific type of mineral, but may be applied to a wide range of minerals. In table 1 some examples of applicable minerals are listed together with their composition and their calculated ability to the react with $CO_2$.

TABLE 1

List of some minerals that potentially can be used for $CO_2$ sequestration, wt. % of the elements that potentially can form carbonate and the potential amount of $CO_2$ per ton mineral dissolved.

| Mineral | Formula | % CaO | % MgO | % FeO | Calc. ton CO2/ ton mineral |
|---|---|---|---|---|---|
| Brucite | $MgO \cdot H_2O$ | 0 | 69.1 | 0 | 0.75 |
| Forsterite | $Mg_2 \cdot SiO_4$ | 0 | 57.3 | 0 | 0.62 |
| Olivin | $(FeMg)_2SiO_4$ | 0 | 45-51 | | 0.54 |
| Serpentine | $Mg_2Si_4 \cdot (OH)_8$ | 0 | 43.46 | 0 | 0.49-0.56 |
| Antigorite | $(Mg,Fe)_3Si_2O_5(OH)_4$ | 0 | 30.15 | | 0.33 |
| Wollastonite | $CaSiO_3$ | 48.3 | 0 | 0 | 0.38 |
| Diopside | $CaMgSi_2O_6$ | 25.9 | 18.6 | 0 | 0.41 |
| Anorthite | $CaAl_2Si_2O_8$ | 19.2 | 0 | 0 | 0.20 |
| Tremolite | $Ca_2Mg_5Si_8O_{22}(OH)_2$ | 8.3 | 0 | 28.8 | 0.1-0.4 |
| Actinolite | $Ca_2Fe_5Si_8O_{22}(OH)_2$ | 9.9 | 15 | 0 | 0.11-0.30 |

Table 1 shows that the most favourable of these minerals is brucite. However, the resources of brucite are relatively small. Forsterite (magnesium olivine) and Mg—Ca olivine's calculated potential is about 30% less than brucite. However, the known resources are much larger than brucite and have much lower exploitation cost than brucite and, therefore, could be more attractive.

In one aspect of the present invention, the rock is waste rock from the extractive industry and can be moved to the emission source or remain in place and the emission source is established at the site of the extractive industry. In another aspect, the rock is provided from local available rock sources near the emission source; and in yet another aspect, specific rocks are selected and transported to the site close to the $CO_2$ source.

The invention claimed is:

1. A method for leaching of minerals and sequestration of $CO_2$, comprising:
   forming a rock pile;
   injecting an emission gas comprising $CO_2$ into a lower part of the rock pile;
   supplying a leaching liquid in a top part of the rock pile;
   collecting an enriched leaching liquid from the lower part of the rock pile, wherein the leaching liquid comprises dissolved minerals and carbonate ions.

2. The method of claim 1, wherein the method further comprises precipitating mineral carbonates from the enriched leaching liquid, thereby sequestering $CO_2$ in the form of solid mineral carbonates.

3. The method of to claim 2, wherein the method further comprises
extracting one or more metals from the enriched leaching liquid before or after sequestering $CO_2$ in the form of solid mineral carbonates.

4. The method of claim 3, wherein the extraction is performed by pH or $E_h$ controlled precipitation, by ion exchange, or solvent extraction electro winning.

5. The method, wherein the rock is tailings or waste rock material from the extractive industry.

6. The method of claim 1, wherein the rock pile comprises silicates comprising carbonate forming elements selected from calcium, magnesium, and iron.

7. The method of claim 1 wherein the rock comprises silicates, oxide minerals enriched in one or more metals comprising copper, nickel, silver, zinc, uranium, thorium, wolfram, molybdenum and rare earth elements (REE), optionally together with one or more sulfide minerals of copper, nickel, zinc or silver.

8. The method of claim 1, wherein the leaching liquid is water, hydrochloric acid, sulfuric acid, nitric acid, carbonic acid or a mixtures thereof.

9. The method of claim 2, wherein the precipitation is controlled by controlling the pH of the leaching solution.

10. The method of claim 1, wherein the emission gas containing $CO_2$ contains rest heat.

11. the method of claim 1, wherein the emission gas is power plant gas emission or hydrated lime/lime-cement plant gas emission.

12. A plant for leaching of minerals and sequestration of $CO_2$ comprising a rock pile, a gas distribution system arranged below or in a lower part of the rock pile in fluid communication with a source for emission gas comprising $CO_2$ and comprising gas outlets for releasing emission gas into the rock pile, a leaching liquid distribution system arranged above or in an upper part of the rock pile, and an enriched leaching liquid collection system arranged below the gas outlets.

13. The plant of claim 12, wherein the enriched leaching liquid collection system comprises at least one pipeline in fluid communication with a precipitation unit, where said precipitation unit comprises pH-controlling or $E_h$-controlling equipment; and wherein the precipitation unit is adapted for precipitation of metal carbonates from the leaching liquid.

14. The plant of claim 12 or 13, wherein the enriched leaching liquid collection system comprises at least one pipeline in fluid communication with a plant for extracting one or more metals selected from the group comprising copper, zinc, nickel, rare earth elements, uranium, wolfram, molybdenum and thorium by solvent extracting, ion exchange, or pH or $E_h$ controlled precipitation.

15. The plant of claim 12 or 13, wherein the gas distribution system comprises mainly vertically pipes arranged at the bottom of the rock pile with a plurality of openings.

* * * * *